United States Patent
Storm

(10) Patent No.: US 10,449,848 B2
(45) Date of Patent: Oct. 22, 2019

(54) ELECTRIC PROPULSION SYSTEM FOR A VEHICLE

(71) Applicant: VOLVO TRUCK CORPORATION, Göteborg (SE)

(72) Inventor: Jonas Storm, Hisings Backa (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 120 days.

(21) Appl. No.: 15/544,263

(22) PCT Filed: Jan. 26, 2015

(86) PCT No.: PCT/EP2015/025001
§ 371 (c)(1),
(2) Date: Jul. 18, 2017

(87) PCT Pub. No.: WO2016/119811
PCT Pub. Date: Aug. 4, 2016

(65) Prior Publication Data
US 2018/0009310 A1 Jan. 11, 2018

(51) Int. Cl.
*B60K 6/52* (2007.10)
*B60L 50/53* (2019.01)
(Continued)

(52) U.S. Cl.
CPC ............. *B60K 6/52* (2013.01); *B60L 50/53* (2019.02); *B60L 58/12* (2019.02); *B60W 10/08* (2013.01);
(Continued)

(58) Field of Classification Search
USPC .......................................................... 701/22
See application file for complete search history.

(56) References Cited

U.S. PATENT DOCUMENTS

| 9,669,820 B1* | 6/2017 | Conlon | B60W 10/06 |
| 2006/0046895 A1* | 3/2006 | Thacher | B60L 7/26 |
| | | | 477/4 |

(Continued)

FOREIGN PATENT DOCUMENTS

| CN | 1492815 A | 4/2004 |
| CN | 101659202 A | 3/2010 |

(Continued)

OTHER PUBLICATIONS

Japanese Official Action (dated Jan. 10, 2019) for corresponding Japanese App. 2017-539287.

(Continued)

*Primary Examiner* — Tyler D Paige
(74) *Attorney, Agent, or Firm* — Venable LLP; Jeffri A. Kaminski

(57) ABSTRACT

A vehicle provided with an electric propulsion system and a method for controlling the electric propulsion system are provided. The system includes a first Electrical Motor (EM1) connected via first Electrical Connections (EC1) to an on-board Energy Storage System (ESS1) and drivingly connected to wheels. The system further includes a second Electrical Motor (EM2) connected via second Electrical Connections (EC2) to one or several electrical energy sources and drivingly connected to wheels. The system is controlled by an Electronic Control Unit (ECU) and the Electrical Motors (EM1, EM2) are used in dependence of the State Of Charge (SOC) level in the first Energy Storage System (ESS1) and the availability of electrical energy for the second Electrical Motor (EM2). The ECU is programmed to include an energy transfer mode in which the use of the second Electric Motor (EM2) for propulsive force is increased and the use of the first Electric Motor (EM1) for regenerative breaking is increased when the State Of Charge (SOC) level in the first electrical Energy Storage System (Continued)

(ESS1) is below a defined level and it is estimated that there is more electrical energy available for the second Electrical Motor (EM2) than for the first Electrical Motor (EM1).

18 Claims, 2 Drawing Sheets

(51) Int. Cl.
*B60W 10/08* (2006.01)
*B60W 10/26* (2006.01)
*B60W 20/00* (2016.01)
*B60W 30/18* (2012.01)
*B60W 20/14* (2016.01)
*B60L 58/12* (2019.01)

(52) U.S. Cl.
CPC ............ *B60W 10/26* (2013.01); *B60W 20/00* (2013.01); *B60W 20/14* (2016.01); *B60W 30/18127* (2013.01); *B60L 2220/42* (2013.01); *B60W 2510/244* (2013.01); *B60W 2710/244* (2013.01); *B60Y 2200/912* (2013.01); *Y02T 10/6265* (2013.01); *Y02T 10/646* (2013.01); *Y02T 10/705* (2013.01); *Y02T 10/7005* (2013.01); *Y02T 10/7044* (2013.01); *Y02T 10/7258* (2013.01)

(56) References Cited

U.S. PATENT DOCUMENTS

| | | | | |
|---|---|---|---|---|
| 2007/0158119 | A1* | 7/2007 | Pascoe | B60K 6/48 180/243 |
| 2008/0223633 | A1 | 9/2008 | Kim | |
| 2010/0252339 | A1 | 10/2010 | Bibeau et al. | |
| 2013/0076126 | A1* | 3/2013 | Hashimoto | B60L 1/003 307/9.1 |
| 2014/0024490 | A1* | 1/2014 | Bangura | F16H 37/065 477/3 |
| 2016/0368473 | A1* | 12/2016 | Matsushita | B60W 20/10 |
| 2018/0009310 | A1* | 1/2018 | Storm | B60K 6/52 |
| 2018/0372200 | A1* | 12/2018 | Kumar | B60W 20/11 |

FOREIGN PATENT DOCUMENTS

| | | |
|---|---|---|
| DE | 42 39 164 C1 | 4/1994 |
| DE | 102010044501 A1 | 3/2012 |
| FR | 2 799 162 A1 | 4/2001 |
| FR | 2 822 759 A1 | 10/2002 |
| FR | 2 908 086 A1 | 5/2008 |
| JP | 2013184584 A | 9/2013 |
| WO | 02/076783 A1 | 10/2002 |
| WO | 2005115786 A1 | 12/2005 |
| WO | 2014005705 A2 | 1/2014 |

OTHER PUBLICATIONS

International Search Report (dated Oct. 19, 2015) for corresponding International App. PCT/EP2015/025001.

* cited by examiner

ELECTRIC PROPULSION SYSTEM FOR A VEHICLE

BACKGROUND AND SUMMARY

The invention relates to a propulsion system for a Hybrid Electrical Vehicle (HEV) or Electrical Vehicle (EV) comprising at least one Energy Storage System (ESS) and at least two Electric Motors (EM) The propulsion system is for example suitable for an articulated vehicle.

In recent years, development and commercialization of Hybrid Electric Vehicles (HEVs) and Electric Vehicles (EVs) that are effective in reducing fuel consumption and exhaust gases such as $CO_2$ have been pursued. In order to reduce the environmental impact of a vehicle is it thus desired to use an electric propulsion system as much as possible and it should thus be preferred to use EVs only. However, there is a limit in the available range for such a vehicle due to the size and capacity of batteries mounted in the vehicles. One way of improving the range for a vehicle with an electric propulsion system is to provide the vehicle with an Internal Combustion Engine (ICE) so as to form a HEV. HEVs may thus provide a solution which may increase the range of the vehicle compared to an EV. However, the cruising range of a HEV in electric mode is in general even more limited than for an EV since the size and capacity of batteries mounted in the HEV is even smaller than for an EV. Hybrid vehicles must therefore use an engine and a motor in combination to secure a long cruising range.

For commercial vehicles, e.g. heavy load vehicle, construction equipment and public buses, may it be desirable to use more than one electric motor for propulsion of the vehicle in order to manage heavy loads and/or managing to drive where there are bad surface conditions. In particular may this be useful for a vehicle or vehicle composition forming a coupled vehicle in which several entities or modules are connected via one or several pivot able joints. Examples of such coupled vehicles may be an articulated vehicle or a vehicle train in which one or several trailers are connected to a leading vehicle. For such coupled vehicles there may be a desire to provide a traction force to the different articulated parts or trailers in order to improve traction and controllability of the coupled vehicle. An articulated vehicle is disclosed in US 2012/168204 in which there is provided an electric traction motor on each one of the two articulated parts. In this document is it also disclosed an example in which the same motor is powering driven wheels on both the articulated parts. However, there is a particular difficulty in providing a mechanical connection for transferring mechanical power between the different articulated parts of the vehicle or vehicle train. In this case is it somewhat easier to be able to transfer electric energy via the articulated connection, e.g. use stored electrical energy in a battery on a first articulated part and use it for motors located on the same articulated part and on another articulated part. However, there may be problems with wear of the wires in the articulation as well as the need for long wires such that it may be desired to avoid the need for connecting a battery to a motor located at a rather long distance from the battery. An example of a vehicle train having separate electric propulsion systems is disclosed in US 2014/052318. As disclosed therein is a separate battery and motor provided for each entity in the vehicle train. It may thus be generally considered, in particular if the articulated parts may be easily disconnected such as for a truck and trailer, to be unwise to have a battery dimensioned for a larger vehicle when a pivot able joint is disconnected and a module/entity of the vehicle is disconnected. In addition, the previous mentioned problems with wear of and need for long wires thus imply the use of separate electric propulsion systems on each vehicle.

Another important feature concerning the above described systems is the possibility to dimension and provide energy for the different propulsion units having different energy storage systems (ESS). In case there is one only energy storage system present, the energy consumption may easily be optimized to be distributed to the desired motor until the ESS is empty. In case there are different ESS present, the use of energy may be optimized in order to avoid that one of the ESS is depleted before another. The conjoint control of several separate ESS for a vehicle train is for example described in US 2014/052318. It is described therein how the unities are controlled to be recharged and discharged in order to keep a desired individual state of charge of the different ESS comprised in the vehicle train relative each other.

Hence, the invention is directed to the problem of designing and managing an electric propulsion system for a vehicle comprising at least two electric propulsion systems in order to manage the supply and storage of electrical energy, e.g. for a coupled vehicle comprising several vehicle entities or modules such as an articulated vehicle or a vehicle train.

The invention is thus directed, according to an aspect thereof, to a vehicle provided with an electric propulsion system (2). The vehicle may for example be a Hybrid Electrical Vehicle (HEV) or Electrical Vehicle (EV). The most commonly used HEV to day is the kind comprising an electrical propulsion system comprising an Electrical Motor (EM) and a commonly used mechanical powertrain connected to an Internal Combustion Engine (ICE). However, the basic principle for the invention is applicable regardless of which system the electrical propulsion system is combined with.

The system may be used for a wide variety of vehicles. By vehicles in this context is thus meant for example buses, construction equipment, lorries, combination of a truck and trailer, personal cars, commercial vehicles among others. The invention may thus be used for essentially any kind of vehicles even though there are some particular advantages when used for vehicles comprising a pivot able joint, e.g. an articulated vehicle, a truck and trailer combination or other combinations of vehicle modules connected to form a vehicle train.

The electrical propulsion system comprises a first Electrical Motor (EM1) for propulsion of the vehicle. The EM1 is provided with first Electrical Connections (EC1) designed to be connected to and powered by one or several electrical energy sources. Hence, the EM1 may be connected to one or several energy storages as well as sources for generating energy onboard or being connected to external power supplies. The EM1 is drivingly connected to at least one driven wheel in order to provide for a propulsion force to the vehicle. The EM1 may thus be connected to a single wheel, e.g. a wheel hub motor, or to one or several driven axles connected to wheels.

The electrical propulsion system also comprises a second Electrical Motor (EM2) for propulsion of the vehicle provided with second Electrical Connections (EC2) designed to be connected to and powered by one or several electrical energy sources. There is at least one driven wheel drivingly connected to the EM2. The EM2 may or may not be of the same kind as the EM1. The EM1 may for example be one of a pair of wheel hub motors and the EM2 may be a motor for powering a driven axle for another pair of wheels or both EM1 and EM2 may be designed and implemented in the electric propulsion system to power two different driven axles connected to respective wheels for each axle. EM1 and EM2 may also be wheel hub motors both of them configured to be connected to different set ups of electrical power supplies. In general, EM1 and EM2 have some difference in the set up of power supplies such that all electrical energy power sources are not the same for both motors. One motor could also provide power to more than one driven axle. There may of course also be further motors included in the electrical propulsion system if desired.

The electrical propulsion system also comprises an on-board Energy Storage System (ESS1) electrically connected to the first Electrical Motor (EM1) via said first Electrical Connections (EC1) in order to provide electrical power to the first Electrical Motor (EM1). The ESS1 may for example be a battery or a set of batteries or other entities able of storing electrical energy.

In order to control the electric propulsion system is there an Electronic Control Unit (ECU) incorporated in the system. The ECU may be a single processor or be a group of processors which together form the ECU. The ECU is programmed to control the electric propulsion system and the use of the EM1 and EM2. The use of the EM1 and EM2 is in general dependent on many parameters and may in particular be many differences dependent on if the vehicle is a HEV or EV. However, one essential parameter for controlling the motors EM1 and EM2 is the availability of electrical energy and the State Of Charge (SOC) for different on board energy storages. Hence, the motors EM1 and EM2 are controlled at least depending on the State Of Charge (SOC) level in the first Energy Storage System (ESS1). For example, there is a maximum level of charge over which further charging may cause damage to the ESS1 and the EM1 should thus accordingly be controlled to not be used for regenerative braking in order to regenerate the ESS1. The ECU is further programmed to control the operation of EM1 and EM2 in dependence of the availability of electrical energy for the EM2. The availability differs depending on which source/-s for providing energy that is/are present and able to be used at the moment. For example, the EM2 may be connected to a second Energy Storage System (ESS2) and in case there are no other sources connected to EM2, and the EM1 is only using ESS1 as a source for electrical energy, the ECU could be programmed to primarily use the electric motor connected to the energy storage system having the highest SOC level to be used for propulsion of the vehicle. This simplified model may of course be refined and take into account present, and estimated future, vehicle operation and driving conditions. In case there are further energy sources present, e.g. either (or both) of the electrical propulsion systems being able to use some kind of on-board generator, the possible maximum distance with the on board generated electricity may be taken into account. Hence, the overall possibility of the electric propulsion system, including two or more electric motors, to be supplied by electric energy as well as the possibility for supply of electric energy for each individual motor is evaluated. The system may be further refined by evaluating and estimating the different kind of sources for generating/using stored electric energy, when it is decided which motor or motors that should be primarily used for propulsion of the vehicle. In addition to the energy supply problem are also other parameters like safety and driving smoothness taken into account when controlling the use of motors and such parameters may set limits for how the electric motors may be used.

The electrical propulsion system may for example comprise power collectors adapted to be connected to an external power supply, e.g. electrically conductive rails on the ground or lines in the air, in order to supply electrical power to the system while the vehicle is travelling. In case not all electric storages on the vehicle have the possibility to be supplied by the external power source is the vehicle preferably controlled to primarily use the motors which may be supplied by electricity from the external source while travelling and being connected.

In order to enable an improved charging of one or several electrical Energy Storage Systems (ESS), e.g. batteries, in the electric propulsion system and/or controlling the distribution of the charge between several electrical energy storage systems to be more evenly distributed or distributed according to any other specific desire, may the Electronic Control Unit (ECU) be programmed to include an energy transfer mode. In this mode is it thus intended that the electrical propulsion system is controlled with a focus on the State Of Charge (SOC) of the electrical ESS and the distribution of charge between several such systems if present and other parameters such as driving comfort, speed and/or the overall energy efficiency may be set to be less important in this mode. In the energy transfer mode is the use of the second Electrical Motor (EM2) for propulsive force increased and the use of the first Electrical Motor (EM1) for regenerative braking is increased. This could mean the braking action from an EM, e.g. EM1, electrically connected to an ESS, e.g. ESS1, is used more frequently, during longer periods and/or used while applying a stronger braking force than when the vehicle is driven in other modes. In the energy transfer mode is thus the electric propulsion system controlled in order to reduce the consumption of electrical energy from, or even increase the SOC of, a selected ESS by regenerative braking at the cost of an increased use of another energy source for propulsive force. This means that the overall energy consumption may be allowed to be increased as a result of friction losses from using more propulsion and braking force than desired for the resulting propulsive force The energy transfer mode may be selected manually or automatically. It may for example be possible to have indicators, e.g. indicating low SOC level in one ESS, e.g. ESS1, or uneven distribution of SOC between several ESS, e.g. ESS1 and ESS2, in order to advise a driver to select the energy transfer mode. At certain occasions may it not be desired to run the vehicle in an energy transfer mode, e.g. if the driver knows he soon will be stopping the vehicle and charging the vehicle over-night. There may also be some kind of semi-automatic system in which the driver may choose if the vehicle should be run in the energy transfer mode in certain conditions and having other conditions in which the vehicle is mandatory to be set in the energy transfer mode or not. One occasion when it should not be possible to use the energy transfer mode is when all Energy Storage Systems (ESS) have been recharged to a maximum allowable SOC limit and the energy transfer mode could be obligatory to be used to recharge an ESS when the SOC is below a certain SOC level, e.g. when the ESS is depleted and the vehicle is in a low temperature environment. However, the indication for or the automatic control to set the vehicle to run in an energy transfer mode is at least dependent on the State Of Charge (SOC) level in an electrical Energy Storage System, e.g. ESS1 which is electrically connected to EM1, which should be below a defined level in order to be recharged by regenerative braking. In addition, in order to assure that the energy transfer mode actually performs a desired action should it be estimated that there is more electrical energy available for propulsion of the vehicle in the electrical energy sources connected to another electrical motor, e.g. EM2, than the estimated available energy in the electrical energy sources connected to the electrical motor being used for regenerative braking, exemplified as EM1, in order to regenerate an ESS having a SOC below a predefined value, which was exemplified as EES1 previously. The criteria for using the energy transfer mode could in somewhat simplified way be described as the system is controlled to recharge a first energy storage system by increased regenerative braking when there is a need or desire to recharge the selected energy storage system, e.g. due to a low state of charge, and evaluate and considering this need and compare with the present possibilities to use another electrical energy source for an increased use in providing electric energy to provide the overall propulsive force for the vehicle. Another way of explaining this feature could be to say that there is an increased use of regenerative braking in the energy transfer mode in order to regenerate a selected energy storage system while it is estimated that another energy source is better suited to provide electrical energy for a propulsive force to the vehicle, sometimes to the extent that it is even beneficial to provide braking in an excess of the total braking demand for the vehicle (when controlled in other modes) in order to regenerate the selected energy storage system even though there will be an increase in friction losses and a need to provide still extra propulsion force in order to compensate for the friction losses by another energy source.

There may be several different criteria set in order to decide when the energy transfer mode should be used. These criteria depend among other things on which electrical energy sources that are connected to the second Electrical Motor (EM2). The vehicle may for example be designed such that the EM2 is electrically connected to and powered by a second Energy Storage System (ESS2). In this case could the Electronic Control Unit (ECU) be programmed such that it is estimated that there is more electrical energy available for propulsion of the second Electrical Motor (EM2) when the available electrical energy in said second Energy Storage System (ESS2) is higher compared to the first electrical Energy Storage System (ESS1). This measure may for example be used when the ESS1 and ESS2 are of the same size and used equally during normal driving operations. The case may also be that one of the ESS, e.g. ESS1, is intended to be used mainly for propulsion and have a considerably larger storage capacity than the other ESS, e.g. ESS2, which is intended to provide an additional force only during certain occasions. In this case could the ECU be programmed to set the vehicle in the energy transfer mode in dependence of the relative SOC levels for the respective ESS, e.g. may the ECU be programmed to decide that the relative SOC levels should be set to be the same or that the SOC level for the smaller EES, e.g. ESS2, should be above a rather high limit, e.g. 75%, as long as the main ESS, e.g. ESS1, is above a lower level, e.g. 30%, in order to have the additional ESS ready to be used when needed during certain occasions. The levels could also be set in dependence on a predicted future use of the vehicle, e.g. by the use of sampled energy consumption for the respective ESS for a certain route or working cycles or by estimating the use of the respective ESS from GPS and map data for a predicted route. Hence, the ECU could be programmed such that it is estimated that there is more electrical energy available for propulsion of the second Electrical Motor (EM2) when the electrical energy in said second Energy Storage System (ESS2) is able to provide electrical power for propulsive force for a longer time than the first Energy Storage System (ESS1) may provide energy to the first Electrical Motor (EM1) for propulsion of the vehicle based on estimation of present or future vehicle operation conditions. The ECU could thus be set to estimate the future use of the respective Electrical Motors (there may be more than two) in the vehicle and in dependence of the SOC of the electrical Energy Storage Systems (there may also be more than two) and how the ESS are connected to the EM control the system in the energy transfer mode to control the propulsion and braking operations to get a desired SOC level of the respective ESS. In the examples given herein is the EM1 connected to the ESS1 and the EM2 connected to the ESS2 if not otherwise indicated. However, it shall be noted that one ESS may be connected to several EM. In addition, one EM may be connected to several ESS. The ECU could also be programmed such that it is estimated that there is more electrical energy available for propulsion by the EM2 when the ESS2 is able to provide energy with less reduction of the overall SOC of the on board ESS compared with using the ESS1 for providing electrical energy to the EM1. This could for example be the case if there is a source for generating electric energy in order to propel EM2 or charging ESS2. In the case of a Hybrid Electric Vehicle (HEV) and there is a possibility to directly provide a propulsion force to the same driven wheel as EM2 from another power source, e.g. an Internal Combustion Engine (ICE), could it also be decided that the there is more electrical energy available for the EM2 than the EM1 even though the SOC level in ESS2 actually is lower than in ESS1. Below follows further reasoning concerning the possibility to use other power sources to power an EM which may be used in addition to, or replacing, on board ESS. It shall be further noted that the energy transfer mode may be overruled by other modes, e.g. if a sport mode is selected is it most probably not desired to include more braking than needed or if some kind of snow/ice mode is selected should the braking most probably be adapted to provide most possible grip and allocate the braking actions for this purpose instead of controlling the braking to regenerate optimally as desired in the energy transfer mode. Likewise, the energy transfer mode should of course be overruled for braking actions, or propulsion forces, in order to drive the vehicle in a safe manner.

As disclosed briefly above, the vehicle may be adapted to use further sources, or further supplies, for electric energy than what is originally contained in the on-board electric Energy Storage Systems (ESS) when the vehicle starts. Such other sources may for example be liquid fuel which is used in an Internal Combustion Engine (ICE) or fuel cells using hydrogen to generate electricity for recharging an ESS or being directly connected to power an Electric Motor (EM). Hence, it may thus be decided that there is more available electrical energy for an EM being connected to such a supply as described than the available energy for another EM being connected to an ESS having more actual electrical energy stored. Another way of providing electrical energy is to use some kind of system for continuously supplying electrical power during travel, e.g. by using power collectors being connected to a stationary electrical grid by means of rails on the ground or wires in the air. In this case may the Electronic Control Unit (ECU) be programmed such that it is estimated that there is more available electrical energy for propulsion of the second Electrical Motor (EM2) when the EM2 and/or a second Energy Storage System (ESS2), electrically connected to the EM2, is receiving electrical power by the use of power collectors adapted to be connected to an external power supply (the stationary electrical grid) during travel for supply of electric power to the EM2 and/or the ESS2. In this case could it be considered that the available energy for the electrical devices connected to the grid is infinite and the system should thus primarily use EM2 for propulsion of the vehicle and the other EMs used for regenerative braking in order to charge storage systems connected to the other EMs. The ECU could for example be programmed to control the vehicle to use maximum possible propulsive force for the EMs connected to the grid (directly or via an ESS) and use the other EMs for regenerative braking. Alternatively, the load for regenerative braking is optimized for the EMs not connected to the grid and the EMs connected to the grid is set to be controlled to provide for the desired total propulsion and braking force. If the power collectors are electrically connected with an ESS, e.g. the ESS2, in order to recharge the ESS2 during travel is there an advantage in that the ESS2 may be charged also at standstill without the need of having a connected EM running for recharge of the ESS. However, it is probably most efficient to connect the power collectors to a so called junction box which is designed to direct the power from the power collectors to a suitable consumer, e.g. an EM, ESS charging or a Power Take-Off (PTO).

The system described above is in particular considered to be useful when there are several Electrical Storage Systems (ESS) on-board a vehicle which systems are electrically isolated from each other. In this case is there thus no possibility to transfer electric energy by electrical wires from one ESS to another ESS. Hence, the system may be used for a system as described above in which the first electrical Energy Storage System (ESS1) is electrically isolated from the electrical energy sources electrically connected to the second Electrical Motor (EM2), including ESS2 when present, such that there is no possibility to directly transfer electric energy to or from said first electrical Energy Storage System (ESS1) and the electrical energy sources electrically connected to the second Electrical Motor (EM2) or the other way around.

The system described above is also thought to be in particular suitable for systems in which at least one of the ESS (and an associated EM) is not adapted to be able to receive power from the grid during travel while at least another ESS (or an EM associated with the at least another ESS) is provided with power collectors for providing electric energy supply during travel of the vehicle. Hence, with reference to the earlier examples given, this is for example the case when the first Electrical Motor (EM1) lacks the possibility to be supplied by electricity from an external power supply during travel, either directly or via charging of an ESS, e.g. ESS1, and the second Electrical Motor (EM2) is connected via electrical connections to power collectors, either directly or via charging of the ESS2, adapted to be connected to an external power supply during travel. The Electronic Control Unit (ECU) may in this case be programmed to use the EM2 for propulsion of the vehicle, while being connected to the grid, simultaneously as the first EM1 is used for regenerative braking of the vehicle in order to charge the ESS1 when the vehicle is controlled in the energy transfer mode. This method, i.e. using regenerative braking for one motor while another motor is used for propulsion, may of course also be used when the vehicle not is connected to the grid or for other designs of the vehicle as described above.

The vehicle described above may be designed such that the EM1 is drivingly connected to at least a first driven wheel different from at least a second driven wheel being drivingly connected to the EM2. The vehicle could for example be an articulated vehicle in which the EM1 is drivingly connected to a first driven wheel on a first part of an articulated vehicle and the EM2 is drivingly connected to a second, different driven wheel on a second part of an articulated vehicle wherein said first and second parts of the articulated vehicle are on different sides of an articulation of said vehicle. The vehicle could be arranged such that the EM1 is drivingly connected to a first driven axle connected to the first driven wheel and the EM2 is drivingly connected to a second driven axle connected to said second driven wheel.

The vehicle could also be designed such that the first and second Electric Motors (EM1, EM2) are drivingly connected to a common driven wheel, e.g. by powering the same driven axle being connected to said driven wheel. To be noted, this design could be used together with the design in which the EMs are also connected to separate driven wheels, e.g. if there are three driven axles and the EM1 is connected to a first driven axle, the EM2 is connected to a second driven axle and both EM1 and EM2 are connected to a third driven axle. As an alternative, either of the EM1 or EM2 could be disconnected from being drivingly connected to the first respectively second driven axles such that one of the Electric Motors only is drivingly connected to the common (third) driven axle. In this case could the third axle be used for transfer electrical energy to either of the ESSs, e.g. ESS1, by using EM2 for propulsion power to the third axle while EM1 is used to provide a braking torque to the third axle for regeneration of electrical energy in the ESS1. In this case may there thus be an energy transfer without the need to provide a torque for propulsive power to a first driven wheel and a braking force to a second driven wheel causing an increased wear of the tires but instead using the third axle as the power transferring element.

Hence, there are several different designs for which the system is suitable. And it shall be noted that in the above examples have a vehicle comprising two electric motors (EM) been described for the sake of simplicity when giving examples. However, the skilled person understands that there may be further EMs in the system which easily may be integrated and controlled according to the ideas described herein.

The invention further relates to a method for controlling an electric propulsion system for a vehicle, e.g. a Hybrid Electrical Vehicle (HEV) or Electrical Vehicle (EV). The propulsion system comprises a first Electrical Motor (EM1) and a second Electrical Motor (EM2) for propulsion of the vehicle. The EM1 respective EM2 are provided with first Electrical Connections (EC1) respective second Electrical Connections (EC2) designed to be connected to and powered by one or several electrical energy sources. There is at least one driven wheel drivingly connected to the EM1 and at least one driven wheel drivingly connected to the EM2. The system also includes a first electrical energy source being an on-board Energy Storage System (ESS1) electrically connected to the EM1 via said first Electrical Connections (EC1) in order to provide electrical power to power the EM1. For control of the propulsion system is an Electronic Control Unit (ECU) included.

The method comprises the features of controlling the use of the EM1 and the EM2 (and possibly further EMs) in dependence of the State Of Charge (SOC) level in the ESS1 (and possibly further ESSs) and the availability of electrical energy for the EM2. In a generalized form this may be expressed as the control of the EMs in the electric propulsion system is dependent on the availability of electrical energy for the EMs.

The method is further defined by the feature that it comprises an energy transfer mode in which the use of the EM2 for propulsive force is increased and the use of the EM1 for regenerative breaking is increased. The energy transfer mode may be selected manually from indicating means disclosing regenerative mode is desired due to uneven distribution of charge between on board ESS and/or that there is a lot of electric energy available for at least one of the electric propulsion systems. The system may also be set to be triggered automatically in dependence of certain criteria. These criteria are that it is indicated the State Of Charge (SOC) level in at least one on-board ESS, e.g. the first electrical Energy Storage System (ESS1), is below a defined level and, in addition, that it is estimated there is more electrical energy available for the second Electrical Connections (EC2), connected to the second Electrical Motor (EM2), than for the first Electrical Connections (EC1) connected to the EM1. The automatic selection may comprise further parameters in order to change over to the energy transfer mode. Since there in general is some drawback in using the energy transfer mode, e.g. a loss of energy in the transfer and/or not being able to control the vehicle optimally concerning comfort and optimal braking during certain conditions, is it generally preferred that the energy transfer mode not is used, or at least started until there is a real need for the energy transfer mode. It may also be possible to have different levels of energy transfer mode depending on the need or desire to recharge a certain ESS, e.g. may it be allowed to use one EM for propulsion while another is used for regenerative braking when there is a strong urge to recharge a certain ESS and when there is a less need for recharging the energy transfer mode may be more moderately used and the necessary braking and propulsion operations are controlled to be performed by a suitable EM in order to recharge or distribute the electric energy charge to the on-board ESS.

To be selected manually there may be options which not may be overruled, e.g. if all ESS which may be the target for regeneration already are above a critical level for being further charged or that the propulsion is set to provide optimal traction and braking performance due to slippery driving conditions.

The control method may be defined such that it is estimated that there is more available electrical energy for propulsion of a selected Electrical Motor (EM), e.g. the EM2, when the selected EM and/or an Energy Storage System (ESS) electrically connected to the selected EM, e.g. the ESS2, is receiving power during travel via its associated electrical connections, e.g. the second Electrical Connections (EC2), by the use of power collectors. The power collectors are connected to an external power supply such as the public grid (mains) for supplying electric power to the second (EM2) directly or via the ESS2. The electric power may be transferred from the mains to the vehicle by means of power collectors in the shape of roof mounted pantographs intended to be in contact with wires in the air or contact shoes mounted to be in contact with a rail on the ground.

The method may include the feature of controlling at least one of the EMs, e.g. EM1, during a time period to be used for regenerative braking of the vehicle to an extent exceeding the total braking demand for the vehicle during normal control mode of the vehicle during said time period in order to charge an ESS connected to the EM1, e.g. ESS1. In order to compensate for the braking action is the propulsion force compensated by another EM, e.g. the EM2, is controlled during said time period to provide a propulsive force being larger than the total propulsion demand during said time period. In case the vehicle is a Hybrid Electrical Vehicle (HEV) could the propulsion force instead be provided by the other propulsion system, e.g. by an Internal Combustion Engine drivingly connected via a power train to a driven wheel.

The method described above may include the feature of controlling a propulsion unit, e.g. the EM2, to provide a propulsion force to the vehicle simultaneously as an EM, e.g. the EM1, is used for regenerative braking of the vehicle in order to charge an associated ESS, e.g. the ESS1.

BRIEF DESCRIPTION OF THE DRAWINGS

In the following text, the invention will be described in detail with reference to the attached drawings. These schematic drawings are used for illustration purposes only and do not in any way limit the scope of the invention. In the drawings.

DETAILED DESCRIPTION

Figure 1:
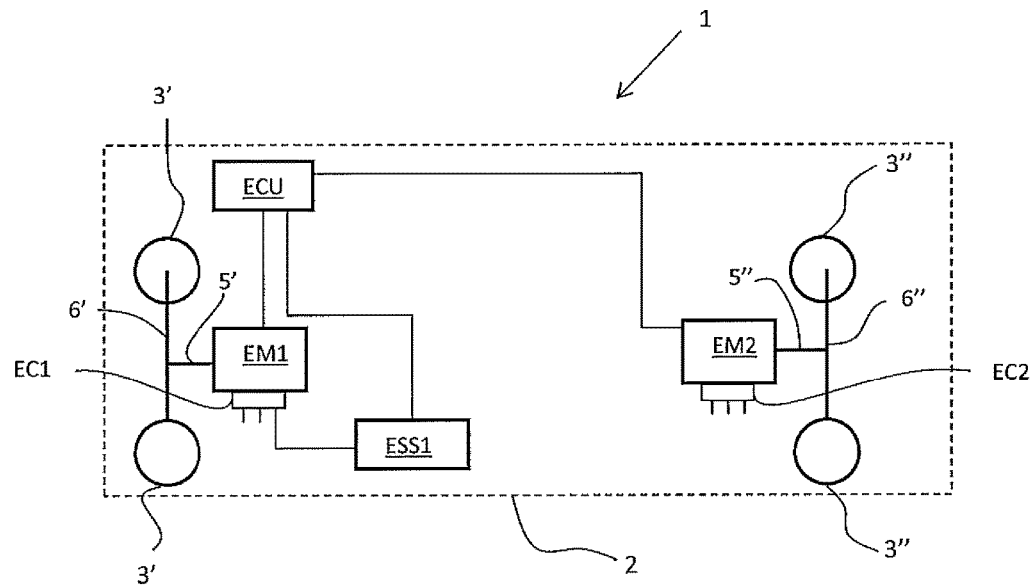
FIG. 1 shows a schematic view of a vehicle provided with an electric propulsion system according the invention having first and second Electric Motors (EM) connected to power different driven axles.

In FIG. 1 is disclosed a vehicle 1 provided with an electric propulsion system 2. The electric propulsion system 2 comprises a first Electric Motor EM1 electrically connected to a first on-board electric Energy Storage System ESS1 via first Electrical Connections EC1. The first Electric Motor EM1 is provided with a primary output shaft 5' mechanically connected to a first driven axle 6' provided with a first pair of driven wheels 3' such that they are drivingly connected to the first Electric Motor EM1. The first Electric Motor EM1 is designed such that it may provide a propulsive force to the first driven wheels 3' when being used as a motor or being able to provide a braking force to the first driven wheels 3' when being used as a generator in order to regenerate electric energy to the first on-board electric Energy Storage System ESS1. The regenerative electric energy from EM1 may of course also be used for other purposes as well. As illustrated herein, ESS1 is shown as one single unit, e.g. a battery, but the ESS1 may comprise several units which together forms the ESS1.

The electric propulsion system 2 further comprises a second Electric Motor EM2 provided with second Electrical Connections EC2 for connection to an electric power supply. The second Electric Motor EM2 is provided with a primary output shaft 5" mechanically connected to a second driven axle 6" provided with a second pair of driven wheels 3" such that they are drivingly connected to the second Electric Motor EM2. The second Electric Motor may also be designed to be able to function as a regenerator during braking even though this feature not is necessary for the inventive system to function.

The electrical connections described above is shown as being integrated in the electric motor in the figures, located right beside the electrical motors EM1, EM2. In the figures are there 3 connections for each motor (illustrated as lines stretching out from box) but the number of connections may of course be less or more. The power connections may be designed according to its intended purpose to receive energy from one or several providers of electrical energy, e.g. on-board Energy Storage Systems, electric motors (when being used for regenerative braking), on-board electricity generating systems such as an electric generator powered by an ICE or fuel cells, plug-in recharge of energy storages when the vehicle is at rest or power collector designed to be connectable to an external power supply infrastructure along the route. The power connections could also be a separate junction box designed to receive electrical energy from one or several sources (as described above) and further designed to distribute the electrical energy to one or several consumers, e.g. electric motors, power take offs, energy storage systems (when being recharged) and electrically powered appliances in the vehicle.

The electric propulsion system is controlled by an Electronic Control Unit ECU which is connected to the first and second Electric Motors EM1, EM2 and to the first electric Energy Storage System ESS1. The Electronic Control Unit ECU is programmed to control the first and second Electric Motors EM1, EM2 in dependence of the State Of Charge (SOC) of the first electric Energy Storage System ESS1. The ECU is designed to receive further inputs of relevant data in order to control the electric propulsion system. The ECU should preferably be connected to receive input concerning all sources of electrical energy connected to the electric motors in the propulsion system in order to be able to decide the total available energy for all providers for each respective motor. The ECU should thus in the system described above preferably be programmed to control the energy flow in the electrical propulsion system in dependence of the state of all the energy sources connected to the EM1 and EM2 and from this information decide if ESS1 should be recharged by regenerative braking by EM1.

As shown in FIG. 1 (and also in the following figures) is the first electrical Energy Storage System in the vehicle 1 electrically isolated from the second Electric Motor EM2 and the electrical energy sources electrically connected thereto. By electrically isolated is meant that there is no possibility to directly transfer electric energy to or from said first electrical Energy Storage System (ESS1) and the electrical energy sources electrically connected to the second Electrical Motor (EM2). However, the systems described in the figures could be designed to have some interfering points, e.g. could there be some kind of back-up connection for providing electricity to vital functions such as braking systems or light, but these systems are not designed to provide for recharging of an on-board energy storage system used for providing propulsive force for a first motor, e.g. ESS1 and its connected EM1, by feeding an electric current from another propulsive, e.g. EM1, or its associated energy storage systems. If energy should be transferred to ESS1 in the system in FIG. 1 from EM2 it is necessary to transfer the energy mechanically by providing an increased propulsive power to EM2, using electrical energy from its connected power sources, and use EM1 for regenerative braking in order to regenerate ESS1. Hence, the power needs to exchange via ground by an increased propulsion torque on the second pair of driven wheels 3" and an increased braking action on the first pair of driven wheels 3'.

Figure 2:
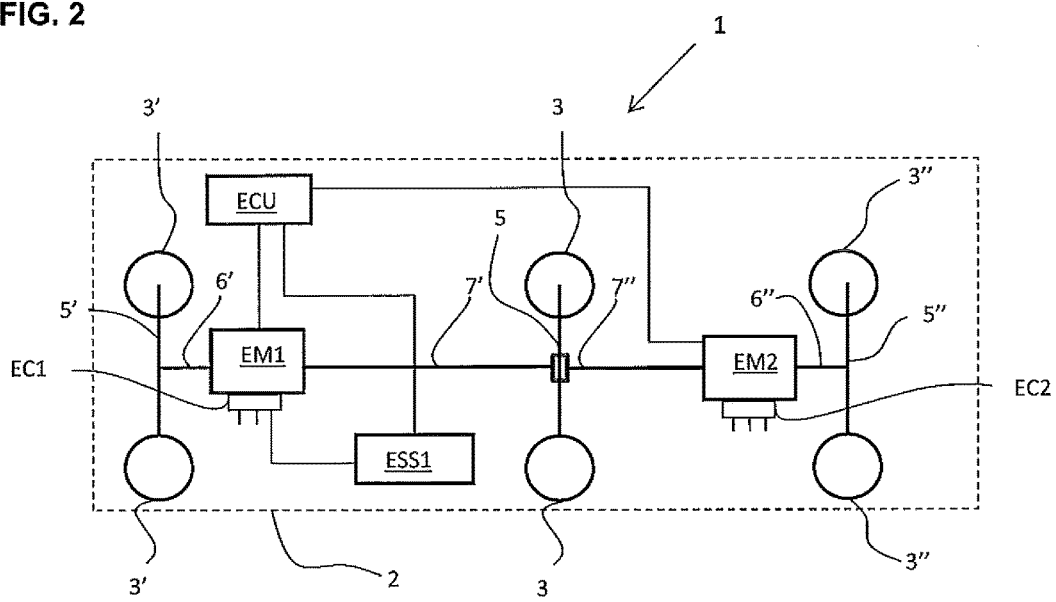
FIG. 2 shows a modification of the vehicle disclosed in FIG. 1 in which the first and second Electric Motors (EM) are connected to a common driven axle in addition to the driven axles shown in FIG. 1; connected to power different driven wheels.

However, in FIG. 2 is disclosed another design of the vehicle 1 which could transfer energy from the second Electric Motor EM2 to the first electric Energy Storage System ESS1 without the need to transfer the energy over ground. The vehicle 1 in FIG. 2 includes all the features of the vehicle in FIG. 1 but is also provided with a third driven axle 5 connected to a third pair of driven wheels 3 which is powered by a secondary output shaft 7' from EM1 and an secondary output shaft 7" from EM2. In this setup could it thus be possible to provide a propulsive torque from EM2 to the third driven axle 5 while EM1 is used for regenerative braking of the third driven axle 5 in order to regenerate ESS1. Hence, the energy transfer from propulsion force and braking action is transferred via the third axle 5 and need not to be transferred via ground over the first pair of driven wheels 5' and second pair of driven wheels 5".

Figure 3:
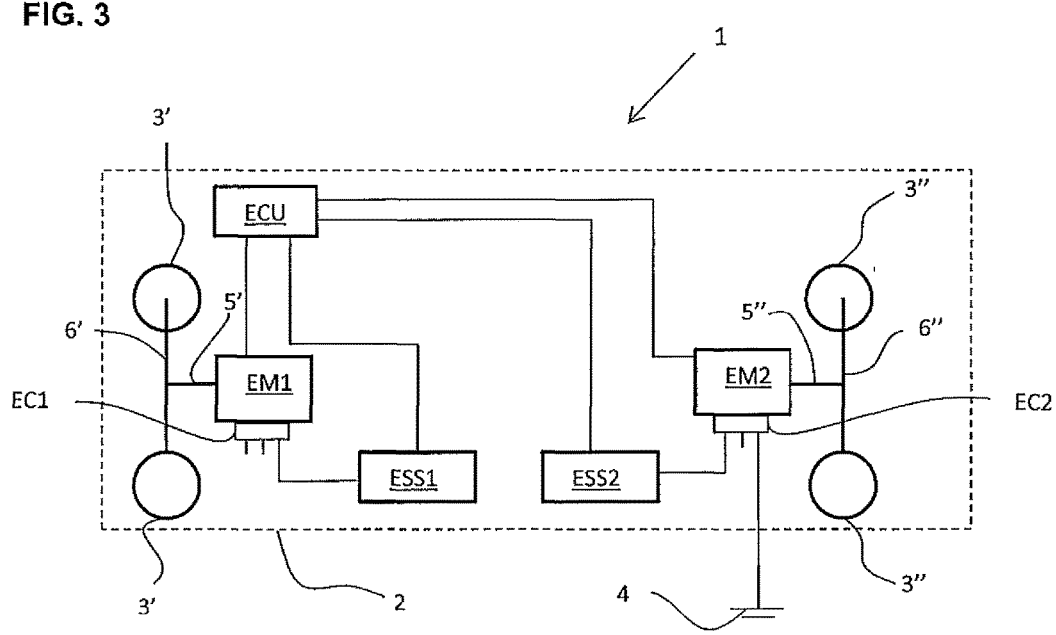
FIG. 3 shows still another modification of the vehicle disclosed in FIG. 1 in which the electric propulsion system is provided with power collectors.

FIG. 3 shows a vehicle 1 which is identical to the one shown in FIG. 1 except for the addition of specific electrical energy sources connected to the second Electric Motor EM2. In FIG. 3 has thus the second Electrical Connections EC2 been connected with a second electric Energy Storage System ESS2 and with a power collector 4 designed to be connectable to an external power supply infrastructure along the route and thus receiving electric energy from the mains while the vehicle is travelling. The ECU should thus be connected to some sensor arrangement indicating when the power collector 4 is connected to the external power supply. The ECU is preferably programmed to use power from the power collectors 4 as much as possible when these are connected to the power supply. The ECU could also be programmed to automatically change to the energy transfer mode when contact with the external power supply is detected. The ECU could for example control EM2 to provide maximum propulsion force (within safety limits concerning the motor itself and driving characteristics for the vehicle) and use EM1 for regenerative braking in order to recharge ESS1 during travel. Alternatively, ESS1 may be set at the most efficient regenerative braking force and be controlled to provide the optimum braking force as long as the vehicle 1 may be controlled as desired. The regenerative braking force may also be controlled by the ECU in dependence on an estimation of how long the vehicle will travel on a route provided with external power supply or by knowing in advance during which parts of a journey the external power supply may be available. For instance, the vehicle may be a public bus for which it is well defined under which parts there is an external power supply available or not and the vehicle operation and energy transfer mode may be optimized for this route in order to assure the SOC level will be within desired limits while reducing the amount of regenerative braking above the needed braking demand (for safe and comfortable travel) to be as low as possible since there are always some energy losses when using propulsive/braking forces in excess to transfer energy.

The design of the electric propulsion system 2 in FIG. 3 is based on the vehicle disclosed in FIG. 1 but could also be applied to the vehicle design shown in FIG. 2.

Figure 4:
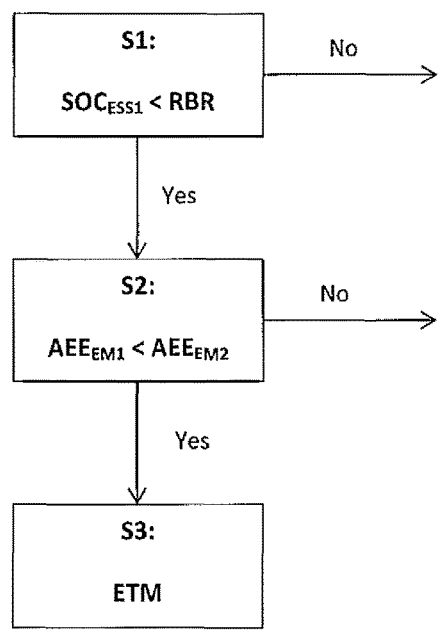
FIG. 4 shows a flow chart of a method for setting the electric control system in an Energy Transfer Mode (ETM)

In FIG. 4 is a flow chart of a method for setting the electric control system in an Energy Transfer Mode (ETM) disclosed.

In a first step, S1, is the State Of Charge (SOC) level measured for an electric Energy Storage System (ESS), e.g. ESS1, designed to provide electric energy to power an associated Electric Motor (EM), e.g. EM1. The SOC level of ESS1 (SOCESS1) is measured in order to decide if ESS1 may be recharged or not. The SOC level of ESS1 must be below a defined value, a Regenerative Braking Recharge SOC level (RBR), in order to be regenerated otherwise there is a risk for overcharging of the ESS1. The he SOC level of ESS1 (SOCESS1) is thus also compared to RBR in step 1 and in case the SOC level is below the RBR limit, the procedure is continued with next step, step 2. If the SOC level is above the RBR limit, there may not be any recharge operation of the ESS. This step may of course be performed for all ESS on board the vehicle.

In a second step, S2, is the Available Electrical Energy (AEE) for EM1 and at least one other EM, e.g. EM2, estimated and compared. In case there only are ESS which are used as electrical power sources connected to the respective motors, the available electrical energy may be estimated easily by measuring the SOC level or net charge for each one of the ESS. However, there may be other sources which may provide for electrical energy, e.g. Internal Combustion Engines used to generate electricity, fuel cells for producing electric energy from for example hydrogen or power collectors connected to an external power source. Hence, in this case must there be some kind of estimation of the available electrical energy which not only is based on the actual stored electricity on board the vehicle. If there are further EM present, the available energy for those EM may also be estimated. However, the Available Electric Energy (AEE) for EM1 (AEEEM1) is compared with the AEE of at least EM2 (AEEEM2). In case it is decided that there is more available energy for EM2 than for EM1 will the process continue to step 3, S3.

In the third step, S3, will the control system of the electric propulsion system be set in an Energy Transfer Mode (ETM). In this mode is the electric propulsion system controlled to use EM1 for regenerative braking, in order to regenerate ESS1, to a greater degree than when the vehicle is controlled in normal mode or other modes. This may for example be done by setting the EM1 to provide a continuous braking torque to regenerate ESS1.

In the above is a criteria for setting the electric propulsion system to be controlled in an energy transfer mode defined to be when it is estimated that there is less available energy for one EM, e.g. EM1, having an associated ESS, e.g. ESS1, than for another EM, e.g. EM2.

Another way of expressing the criteria for how the electric propulsion system is set to be in the energy transfer mode in step S3 and how the Available Electric Energy (AEE) is estimated in S2 follows here.

The SOC level in a selected ESS, e.g. ESS1, having an associated EM, e.g. EM1, is measured. In dependence of the measured SOC level of the selected ESS are certain criteria set for when the Available Electrical Energy (AEE) for one or several EM in the electric propulsion system are considered to be enough to set the electric propulsion system in an energy transfer mode. In the energy transfer mode is the propulsion system controlled such that the EM (EM1) associated with the selected ESS (ESS1) is controlled to be used for regenerative braking more than when the electric propulsion system is controlled in normal mode (or other modes). The regenerative braking is used in order to increase the regenerative recharging of the selected ESS (ESS1). Alternatively could the criteria for setting the electric propulsion system in an energy transfer mode be described so as to detect the available energy for the EMs in the system and in dependence of the available energy for the different EMs set SOC levels for the on board ESSs below which the electric propulsion system is controlled to use an associated EM for recharging by an increased regenerative braking. Hence, the criteria described here may be used as a complement to, or as a definition for, how the criteria for comparing the available energy for different EMs are intended to be used.

The energy transfer mode may also comprise different levels depending on the urge to recharge an ESS and/or the amount of available electrical energy for the EMs. For example, if an ESS has a SOC level close to a lower allowable limit, or an EM is considered to have a very high availability of electric energy as when being connected to the net via power collectors, may the regenerative braking for recharging an ESS be used more intensely than when all ESS have a rather stable SOC level, e.g. having a charge level above 30% of the maximum SOC level. Hence, in the high intensity energy transfer mode could it be allowed to control the electric propulsion system to regenerate an ESS by providing a braking force by one or several EM being above the total braking need for the purpose of normal vehicle driving control and in a low intensity energy transfer mode is the total braking force not exceeding the total braking demand but the braking is allocated to intensify regenerative braking for an EM connected to an ESS for which it is desired to use the regenerative braking for recharging.

The vehicle could be any kind of vehicle but the use seems to be most advantageous for vehicles in which there is a problem in providing a propulsive force by the use of a single electric motor and/or a single energy storage system. This may for example be the case for an articulated vehicle, e.g. a construction equipment or long city buses, or vehicles comprising several units which are detachably connected, e.g. a truck and trailer combination in which there may be a need for additional propulsive force from the trailer in rough road conditions or steep uphill climbing for a heavy loaded trailer.

It is obvious that the electric motors in these figures, exemplified as being drivingly connected to a driven axle for providing propulsive force ta a pair of driven wheels, could be replaced for wheel motors, either all motors only some of them.

The above described figures are only intended to show to the skilled person a few examples of how an electric propulsion system may be designed in order to provide a vehicle with an energy transfer mode working to charge, or distribute charge between, electric Energy Storage Systems in a vehicle without using an electric connection to transfer the energy electrically but using intermediate mechanical work.

The invention claimed is:

1. A vehicle, provided with an electric propulsion system comprising:
    a first Electrical Motor (EM1) for propulsion of the vehicle provided with first Electrical Connections (EC1) designed to be connected to and powered by one or several electrical energy sources;
    at least one driven wheel being drivingly connected to the first Electrical Motor (EM1);
    a second Electrical Motor (EM2) for propulsion of the vehicle provided with second Electrical Connections (EC2) designed to be connected to and powered by one or several electrical energy sources;
    at least one driven wheel being drivingly connected to the second Electrical Motor (EM2);
    an on-board Energy Storage System (ESS1) electrically connected to the first Electrical Motor (EM1) via the first Electrical Connections (EC1) in order to provide electrical power to the first Electrical Motor (EM1); and an Electronic Control Unit (ECU) programmed to control the electric propulsion system and the use of the first Electrical Motor (EM1) and second Electrical Motor (EM2) in dependence of the State Of Charge (SOC) level in the first Energy Storage System (ESS1) and the availability of electrical energy for the second Electrical Motor (EM2), wherein the Electronic Control Unit (ECU) is programmed to include an energy transfer mode in which the use of the second Electrical Motor (EM2) for propulsive force is increased and the use of the first Electrical Motor (EM1) for regenerative braking is increased such that the overall energy consumption is allowed to be increased as a result of friction losses from using more propulsion and braking force than desired for the resulting propulsive force, the energy transfer mode being selected manually or automatically when it is indicated that the State Of Charge (SOC) level in the first electrical Energy Storage System (ESS1) is below a defined level and it is estimated that there is more electrical energy available for the second Electrical Connections (EC2) connected to the second Electrical Motor (EM2) than for the first Electrical Connections (EC1) connected to the first Electrical Motor (EM1).

2. A vehicle according to claim 1, wherein the second Electrical Motor (EM2) is electrically connected to and powered by a second Energy Storage System (ESS2) and the Electronic Control Unit (ECU) is programmed such that it is estimated that there is more electrical energy available for propulsion of the second Electrical Motor (EM2) when the second Energy Storage System (ESS2) is able to provide an electrical power for propulsive force for a longer time than the first Energy Storage System (ESS1) based on estimation of present or future vehicle operation conditions and/or when the second Energy Storage System (ESS2) is able to provide energy with less reduction of the overall State Of Charge of the on board Energy Storage Systems (ESS1, ESS2) compared with using the first electrical Energy Storage System (ESS1) for providing electrical energy to the first Electrical Motor (EM1).

3. A vehicle according to claim 1, wherein the Electronic Control Unit (ECU) is programmed such that it is estimated that there is more available electrical energy for propulsion of the second Electrical Motor (EM2) when the second Electrical Motor (EM2) and/or a second Energy Storage System (ESS2), electrically connected to the second Electrical Motor (EM2), is receiving electrical power by the use of power collectors adapted to be connected to an external power supply during travel for supply of electric power to the second Electrical Motor (EM2) and/or the second Energy Storage System (ESS2).

4. A vehicle according to claim 3, wherein the power collectors are electrically connected with the second electrical Energy Storage System (ESS2) in order to recharge the second electrical Energy Storage System (ESS2) during travel.

5. A vehicle according to claim 1, wherein the first electrical Energy Storage System (ESS1) is electrically isolated from the electrical energy sources electrically connected to the second Electrical Motor (EM2) such that there is no possibility to directly transfer electric energy to or from the first electrical Energy Storage System (ESS1) and the electrical energy sources electrically connected to the second Electrical Motor (EM2).

6. A vehicle according to claim 1, wherein the first Electrical Motor (EM1) lacks the possibility to be supplied by electricity from an external power supply during travel, either directly or via charging of the first electrical Energy Storage System (ESS1) during travel, while the second Electrical Motor (EM2) is connected via the second Electrical Connections (EC2) to power collectors, either directly or via charging of a second electrical Energy Storage System (ESS2), adapted to be connected to an external power supply during travel.

7. A vehicle according to claim 1, wherein the Electronic Control Unit (ECU) is programmed to use the second Electrical Motor (EM2) for propulsion of the vehicle simultaneously as the first Electrical Motor (EM1) is used for regenerative braking of the vehicle in order to charge the first electrical Energy Storage System (ESS1) when the vehicle is controlled in the energy transfer mode.

8. A vehicle according to claim 1, wherein the first Electrical Motor (EM1) is drivingly connected to at least a first driven wheel different from at least a second driven wheel being drivingly connected to the second Electrical Motor (EM2).

9. A vehicle according to claim 8, wherein the vehicle is an articulated vehicle and the first Electrical Motor (EM1) is drivingly connected to a driven wheel on a first part of an articulated vehicle and second Electrical Motor (EM2) is drivingly connected to at least one driven wheel on a second part of an articulated vehicle, the first and second parts of the articulated vehicle being on different sides of an articulation of the vehicle.

10. A vehicle according to claim 8, wherein the first Electrical Motor (EM1) is drivingly connected to power a first driven axle connected to the first driven wheel and the second Electrical Motor (EM2) is drivingly connected to power a second driven axle connected to the second driven wheel.

11. A vehicle according to claim 1, wherein the first and second Electric Motors (EM1, EM2) are drivingly connected to a common driven wheel, e.g. by powering a common third driven axle being connected to the driven wheel.

12. A method for controlling an electric propulsion system for a vehicle, the propulsion system comprising:

a first Electrical Motor (EM1) for propulsion of the vehicle provided with first Electrical Connections (EC1) designed to be connected to and powered by one or several electrical energy sources;

at least one driven wheel being drivingly connected to the first Electrical Motor (EM1);

a second Electrical Motor (EM2) for propulsion of the vehicle provided with second Electrical Connections (EC2) designed to be connected to and powered by one or several electrical energy sources;

at least one driven wheel being drivingly connected to the second Electrical Motor (EM2);

an on-board Energy Storage System (ESS1) electrically connected to the first Electrical Motor (EM1) via the first Electrical Connections (EC1) in order to provide electrical power to power the first Electrical Motor (EM1); and an Electronic Control Unit (ECU) for control of the electric propulsion system, which method comprises the features of:

controlling the use of the first Electrical Motor (EM1) and second Electrical Motor (EM2) in dependence of the State Of Charge (SOC) level in the first Energy Storage System (ESS1) and the availability of electrical energy for the second Electrical Motor (EM2), wherein the use of the second Electrical Motor (EM2) for propulsive force is increased and the use of the first Electrical Motor (EM1) for regenerative braking is increased such that the overall energy consumption is allowed to be increased as a result of friction losses from using more propulsion and braking force than desired for the resulting propulsive force when the vehicle is controlled in an energy transfer mode which may be selected manually or automatically when it is indicated the State Of Charge (SOC) level in the first electrical Energy Storage System (ESS1) is below a defined level and it is estimated that there is more electrical energy available for the second Electrical Connections (EC2) connected to the second Electrical Motor (EM2) than for the first Electrical Connections (EC1) connected to the first Electrical Motor (EM1).

13. The control method according to claim 12, wherein it is estimated that there is more available electrical energy for propulsion of the second Electrical Motor (EM2) when the second Electrical Motor (EM2) and/or a second Energy Storage System (ESS2), electrically connected to the second Electrical Motor (EM2), is receiving power during travel via the second Electrical Connections (EC2) by the use of power collectors connected to an external power supply for supplying electric power to the second Electrical Motor (EM2) directly or via the second Energy Storage System (ESS2).

14. The control method according to claim 12, wherein the first Electrical Motor (EM1) is controlled during a time period to be used for regenerative braking of the vehicle in order to charge the first electrical Energy Storage System (ESS1) to an extent exceeding the total braking demand for the vehicle during normal control mode of the vehicle during the time period and the second Electrical Motor (EM2) is controlled during the time period to provide a propulsive force being larger than the total propulsion demand during the time period.

15. The control method according claim 14, wherein the second Electrical Motor (EM2) is controlled to provide a propulsion force to the vehicle simultaneously as the first Electrical Motor (EM1) is used for regenerative braking of the vehicle in order to charge the first electrical Energy Storage System (ESS1).

16. A computer comprising a computer program for performing the steps of claim 12 when the program is run on the computer.

17. A non-transitory computer readable medium carrying a computer program for performing the steps of claim 12 when the program product is run on a computer.

18. A control unit (ECU) for controlling an electric propulsion system for a vehicle, the control unit being configured to perform the steps of the method according to claim 12.

* * * * *